(12) United States Patent
Subramanian

(10) Patent No.: US 11,847,322 B2
(45) Date of Patent: Dec. 19, 2023

(54) ARCHIVING OPERATIONS FOR COMPRESSED DATA USING FILE LAYOUT

(71) Applicant: Dell Products L.P., Round Rock, TX (US)

(72) Inventor: Vasu Subramanian, Chapel Hill, NC (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/720,421

(22) Filed: Apr. 14, 2022

(65) Prior Publication Data
US 2023/0333737 A1    Oct. 19, 2023

(51) Int. Cl.
*G06F 3/06* (2006.01)

(52) U.S. Cl.
CPC ............ *G06F 3/0608* (2013.01); *G06F 3/064* (2013.01); *G06F 3/067* (2013.01); *G06F 3/0659* (2013.01)

(58) Field of Classification Search
None
See application file for complete search history.

(56) References Cited

U.S. PATENT DOCUMENTS

| 9,053,100 | B1* | 6/2015 | Malige | H03M 7/30 |
| 2006/0155479 | A1* | 7/2006 | Knowles | G16B 50/50 702/19 |
| 2009/0327322 | A1* | 12/2009 | Pall | G06F 9/541 |
| 2012/0245852 | A1* | 9/2012 | Knowles | G16B 50/50 702/19 |

FOREIGN PATENT DOCUMENTS

DE            60129025 T2 *    2/2008    ............ G06F 16/10

OTHER PUBLICATIONS

Techopedia, "File Handle," https://www.techopedia.com/definition/3313/file-handle, Feb. 2, 2017, 11 pages.

* cited by examiner

*Primary Examiner* — Brian R Peugh
(74) *Attorney, Agent, or Firm* — Ryan, Mason & Lewis, LLP

(57) ABSTRACT

A method comprises retrieving a layout of a file on a storage device, wherein the layout identifies a plurality of locations on the storage device where a plurality of compressed blocks of data are stored. In the method, the plurality of compressed blocks of data are retrieved from the plurality of locations identified in the layout for transmission to and storage in a cloud storage platform.

20 Claims, 6 Drawing Sheets

```
GetFileLayout (
    [IN]     HANDLE    fh,
    [IN]     DWORD     startOffset,
    [IN]     DWORD     length,
    [IN OUT] DWORD     numEntries,
    [OUT]    TUPLE []  OffsetAndLength
}
```

ARCHIVING OPERATIONS FOR COMPRESSED DATA USING FILE LAYOUT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to storage in information processing systems.

BACKGROUND

In data storage, files that are frequently used and/or critical are generally stored in local storage for fast access. Files that are less frequently used and that do not require the same level of access as the files in local storage can be archived and stored in, for example, cloud storage platforms.

When archiving files to cloud destinations from local storage, technical problems exist with transferring data over lower speed network links that may fail before data transmission is complete. In addition, processing data for transmission to cloud locations can be expensive in terms of the number of central processing unit (CPU) cycles needed to process the data. Additionally, data processing for archiving operations may utilize large amounts of compute resources, which can be scarce on certain types of storage appliances. For example, with current archiving approaches, a file system may issue a read request to an underlying block device. In order to satisfy the read request, data is decompressed and returned to a caller. The decompressed data then has to be re-compressed prior to transmission to the cloud destination, which undesirably expends compute resources that may be used for other tasks.

SUMMARY

Illustrative embodiments provide techniques for transferring data to a cloud storage platform that has been previously compressed for storage on a storage device.

In one embodiment, a method comprises retrieving a layout of a file on a storage device, wherein the layout identifies a plurality of locations on the storage device where a plurality of compressed blocks of data are stored. In the method, the plurality of compressed blocks of data are retrieved from the plurality of locations identified in the layout for transmission to and storage in a cloud storage platform.

These and other illustrative embodiments include, without limitation, methods, apparatus, networks, systems and processor-readable storage media.

BRIEF DESCRIPTION OF THE DRAWINGS

FIG. 3 depicts example pseudocode corresponding to a file layout application programming interface (API) according to an illustrative embodiment.

DETAILED DESCRIPTION

Figure 1:
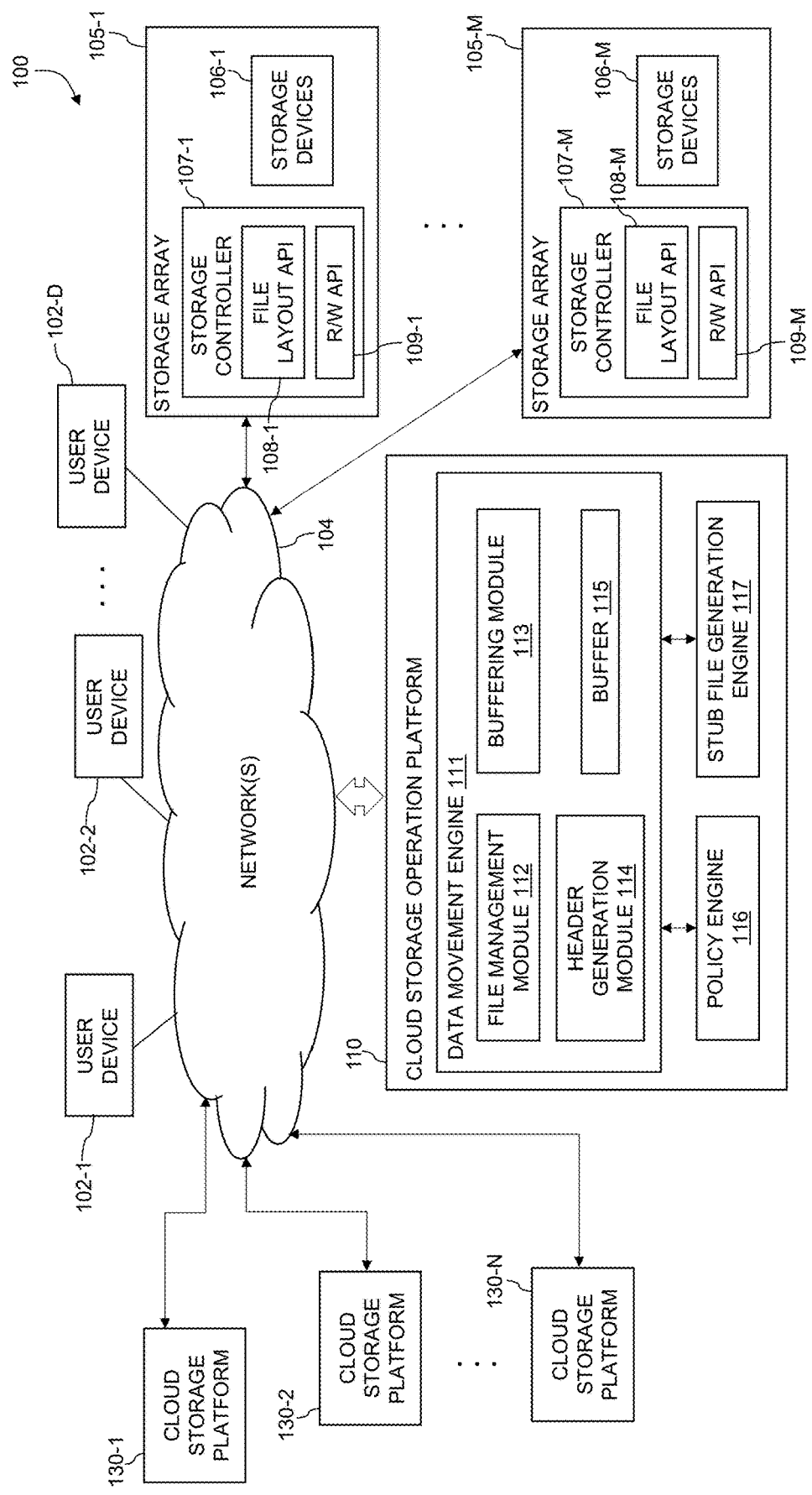
FIG. 1 depicts details of an information processing system for managing retrieval of previously compressed data from a storage device for migration to a cloud storage platform according to an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, an "offset" is to be broadly construed and refers to, for example, an indication of location of data in memory or other data structure. An offset can be relative to another location, and may indicate a distance between a first location (e.g., the beginning of an object) and a location of a given element or point (e.g., for the same object). An offset can be expressed in, for example, bytes or words.

As used herein, a "stub file" refers to a file placed in an original file location on a storage device when the original file is archived to an archive location, such as, for example, a cloud storage platform. According to an embodiment, when a stub file is read in an input-output (TO) operation, the IO operation is passed through to the original file located in the archive location, and the original file may be presented to a user as if the original file were in its original location on the storage device. The stub file occupies less memory space ("size on disk") than the original file.

Illustrative embodiments provide techniques for using file layout information from a storage device to retrieve compressed blocks of data from the storage device. Advantageously, unlike conventional approaches, which require decompression of data to satisfy read requests, and re-compression of the data for archiving, the embodiments provide techniques for transfer of already compressed data to a cloud storage location without having to decompress and re-compress the data, thereby saving large amounts of compute resources.

FIG. 1 shows an information processing system 100 configured in accordance with an illustrative embodiment. The information processing system 100 comprises user devices 102-1, 102-2, . . . 102-D (collectively "user devices 102"). The user devices 102 communicate over a network 104 with a cloud storage operation platform 110. A non-limiting example of a cloud storage operation platform 110 comprises a cloud tiering appliance (CTA), but the embodiments are not necessarily limited thereto. The user devices 102 may also communicate over the network 104 with a plurality of storage arrays 105-1, . . . 105-M, collectively referred to herein as storage arrays 105. The storage arrays 105 comprise respective sets of storage devices 106-1, . . . 106-M, collectively referred to herein as storage devices 106, coupled to respective storage controllers 107-1, . . . 107-M, collectively referred to herein as storage controllers 107. The storage controllers 107 comprise respective instances of file layout APIs 108-1, . . . 108-M (collectively "file layout APIs 108") and read/write (R/W) APIs 109-1, . . . 109-M (collectively "R/W APIs 109").

The user devices 102 can comprise, for example, Internet of Things (IoT) devices, desktop, laptop or tablet computers, mobile telephones, or other types of processing devices capable of communicating with the cloud storage operation platform 110 and each other over the network 104. Such devices are examples of what are more generally referred to herein as "processing devices." Some of these processing devices are also generally referred to herein as "computers." The user devices 102 may also or alternately comprise virtualized computing resources, such as virtual machines (VMs), containers, etc. The user devices 102 in some embodiments comprise respective computers associated with a particular company, organization or other enterprise. The variable D and other similar index variables herein such as L, M, N and P are assumed to be arbitrary positive integers greater than or equal to two.

The terms "client," "customer," "administrator" or "user" herein are intended to be broadly construed so as to encompass numerous arrangements of human, hardware, software or firmware entities, as well as combinations of such entities. At least a portion of the available services and functionalities provided by the cloud storage operation platform 110 and/or storage arrays 105 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the cloud storage operation platform 110 and/or storage arrays 105, as well as to support communication between the cloud storage operation platform 110, storage arrays 105 and connected devices (e.g., user devices 102) and/or other related systems and devices not explicitly shown.

Users may refer to customers, clients and/or administrators of computing environments for which archiving and migration are being performed. For example, in some embodiments, the user devices 102 are assumed to be associated with repair technicians, system administrators, information technology (IT) managers, software developers, release management personnel or other authorized personnel configured to access and utilize the cloud storage operation platform 110 and/or storage arrays 105.

The cloud storage operation platform 110 of the system 100 is configured to move data between the storage arrays 105 and one or more cloud storage platforms 130-1, 130-2, . . . 130-N, collectively referred to herein as cloud storage platforms 130. The cloud storage operation platform 110 is also configured to move data from one of the storage arrays 105 to another one of the storage arrays 105, from one of the user devices 102 to another one of the user devices 102, between the user devices 102 and one or more storage arrays 105 or one or more cloud storage platforms 130 and between different locations (e.g., directories) within the same storage array 105 or within the same user device 102.

The cloud storage operation platform 110 is configured to move data, for example, by moving data files, snapshots or other data objects in and between the user devices 102, the storage arrays 105 and the cloud storage platforms 130. A given data object may comprise a single data file, or multiple data files. According to one or more embodiments, the cloud storage operation platform 110 permits administrators to automatically move data in and between the user devices 102, the storage arrays 105 and the cloud storage platforms 130 based on user-configured policies. The cloud storage platforms 130 include, for example, Dell® EMC® Elastic Cloud Storage (ECS), Microsoft® Azure®, Amazon® S3, and/or IBM® Cloud Object Storage (COS) platforms, or other available cloud infrastructures.

The cloud storage operation platform 110 in the present embodiments is assumed to be accessible to the user devices 102, and vice-versa, over the network 104. In addition, the cloud storage operation platform 110 and the user devices 102 can access the storage arrays 105 and the cloud storage platforms 130 over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The cloud storage operation platform 110, in conjunction with functionality provided by the file layout APIs 108 and R/W APIs 109, on behalf of respective infrastructure tenants each corresponding to one or more users associated with respective ones of the user devices 102, provide a platform for managing retrieval of previously compressed data from a storage device and migration of the previously compressed data to a cloud storage platform. Referring to FIG. 1, the cloud storage operation platform 110 comprises a data movement engine 111, a policy engine 116, and a stub file generation engine 117. The data movement engine 111 comprises file management module 112, a buffering module 113, a header generation module 114 and a buffer 115.

The cloud storage operation platform 110, more particularly, the data movement engine 111, in some embodiments comprises configurable data mover modules adapted to interact with the user devices 102, the storage arrays 105 and the cloud storage platforms 130. At least one configuration file is implemented in or otherwise associated with the cloud storage operation platform 110. The state of the configuration file may be controlled at least in part by a job scheduler implemented as part of the cloud storage operation platform 110. The job scheduler interacts with the policy engine 116.

The cloud storage operation platform 110 can include at least one API that permits an external component to control selection between various modes of operation. For example, the above-noted job scheduler can access the configuration file via such an API in order to control a mode of operation of the cloud storage operation platform 110. Additionally or alternatively, an application running on one or more of the user devices 102 can access the configuration file via the API in order to control the mode of operation of the cloud storage operation platform 110.

In some embodiments, the cloud storage operation platform 110 is configurable via the configuration file in a mode of operation in which a particular type of data movement in and between user devices 102, the storage arrays 105 and the cloud storage platforms 130 occurs for a given data object being utilized by an application running on one or more of the user devices 102. Furthermore, other embodiments can configure the cloud storage operation platform 110 in different modes of operation without the use of a configuration file. Thus, such a configuration file should not be viewed as a requirement.

The cloud storage operation platform 110 is illustratively coupled to the network 104 and configured to control transfer of data in and between the user devices 102, the storage arrays 105 and the cloud storage platforms 130. The term "data movement" as used in this and other contexts herein is intended to be broadly construed, so as to encompass data migration as well as other types of movement of data and relocation in and between the user devices 102, the storage arrays 105 and the cloud storage platforms 130. A given data mover module can be implemented at least in part on storage arrays 105 or other storage platforms that implement at least portions of one or more storage tiers of the multi-tier storage system.

In one or more embodiments, the cloud storage operation platform 110 can be used to tier file data and archive block data to the cloud storage platforms 130, and to recall file data and restore block data to the storage arrays 105 from the cloud storage platforms 130. In some embodiments, the cloud storage operation platform 110 can be used to migrate repositories between cloud storage platforms 130, storage arrays 105 and/or user devices 102.

In a file tiering process (also referred to herein as "cloud tiering") or file archiving process, the policy engine 116 is configured to identify files that fit an administrator-defined criteria, and the cloud storage operation platform 110 initiates movement of the identified files to a cloud storage platform 130. The stub file generation engine 117 creates a stub file in the original file location on, for example, the storage array 105 or the user device 102. According to an embodiment, when the stub file is read, the cloud storage operation platform 110 recalls or passes an IO operation through to the original file located in the cloud storage platform 130, and the original file may be presented to a user as if the original file were in its original location on the storage array 105 or user device 102. The stub file generation engine 117 generates a stub file in a source storage location (e.g., storage array 105) for respective ones of the files which have been migrated. The stub files comprise information (e.g., metadata) about the destinations in a target storage location (cloud storage platform 130) so that the files can be retrieved when a request for access is received from, for example, a user device 102. The information may comprise, for example, server names or other identifying information (e.g., IP addresses) about the destinations in the target storage location.

In a block archiving process, the policy engine 116 identifies block snapshots that fit an administrator-defined criteria, and the cloud storage operation platform 110 initiates archiving of the identified snapshots to a cloud storage platform 130, leaving the identified snapshots in the storage arrays 105 or user devices 102. After the identified snapshots are backed up to one or more of the cloud storage platforms 130, the original snapshots can be erased from the storage arrays 105 or user devices 102 to free up space. Users may initiate restoring of one or more snapshots to one or more of the storage arrays 105 or user devices 102.

According to an embodiment, in file tiering, file archiving and block processes, the policy engine 116 scans, for example, files and/or snapshots and applies policy rules to each file and/or snapshot. If there are multiple rules in a policy, the policy engine 116 applies the rules to a given file and/or snapshot until a rule evaluates to "true," and then takes the action associated with the rule, such as, for example, "archive" or "don't archive." Some examples of rules governing whether files and/or blocks are archived may be based on one or more constraints such as, for example, when a file and/or snapshot was last accessed or modified, when file or snapshot attributes were last changed, and/or a size of a file or snapshot (e.g., >10 MB). Rules may also be based on file or snapshot names (e.g., only archive files or snapshots having certain names or parts of names) and/or directory name (e.g., only archive files or snapshots from specified directories or from directories having certain names or parts of names).

In general, storage appliances (e.g., storage arrays 105) compress data blocks when data is stored therein. The embodiments provide techniques for leveraging the already compressed data in the storage appliances when archiving the data to cloud locations (e.g., cloud storage platforms 130). With conventional approaches, data to be archived from, for example, a storage array 105 to a cloud storage platform 130, is decompressed, read and then re-compressed for storage on a cloud storage platform 130. The decompressing and re-compressing of data blocks for archiving operations uses large amounts of computational resources and can result in significant expense and/or processing time. The embodiments provide techniques which save computational resources by moving already compressed data blocks from storage devices (e.g., storage devices 106) to cloud storage platforms 130 without requiring decompression and re-compression of data blocks.

Figure 2:
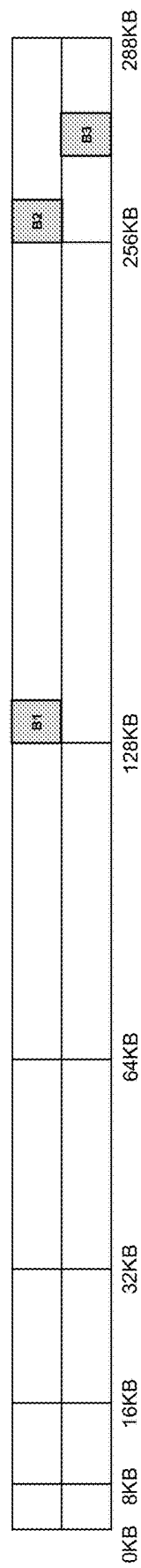
FIG. 2 depicts an allocation of compressed data blocks to different storage locations according to an illustrative embodiment.

In illustrative embodiments, a file stored in a given storage device 106 comprises a plurality of data blocks in different locations (e.g., physical and logical locations) on the storage device 106. For example, FIG. 2 depicts an allocation of compressed data blocks B1, B2 and B3 of a given file to different logical storage locations of a storage device. Referring to FIG. 2, a first 8 KB of a file is allocated to a first storage location with an offset of 128 KB, a second 8 KB of the file is allocated to a second storage location with an offset of 256 KB and a third 8 KB of the file is allocated to a third storage location with an offset of 272 KB. Compressed data blocks B1, B2 and B3 are stored in the first, second and third storage locations. As can be understood from FIG. 2, although the first-third 8 KB sections are contiguous blocks of the file, they are not necessarily allocated contiguously on the underlying storage device. File metadata (referred to herein as an "Inode") comprises a mapping of the file data blocks to their corresponding locations (e.g., storage locations) on the storage device. According to the embodiments, the mapping is represented as tuples comprising an offset and an uncompressed length of the file data block in the format (offset, length). For example, for the first 16 KB of the file, the file data blocks and their corresponding locations are represented as: File (0 KB, 16 KB)→Block (128 KB, 8 KB) (B1) and Block (256 KB, 8 KB) (B2), and for the next 8 KB of the file, the file data block and its corresponding location is represented as: File (16 KB, 8 KB)→Block (272 KB, 8 KB) (B3). (128 KB, 8 KB) designates an offset of 128 KB and a length of 8 KB for the data block B1 on the storage device, (256 KB, 8 KB) designates an offset of 256 KB and a length of 8 KB for the data block B2 on the storage device, and (272 KB, 8 KB) designates an offset of 272 KB and a length of 8 KB for the data block B3 on the storage device. Since (0 KB, 16 KB) starts with 0 and shows a length of 16 KB, (0 KB, 16 KB) indicates the first 16 KB of the file. Since (16 KB, 8 KB) starts with 16 and shows a length of 8 KB, (16 KB, 8 KB) indicates the next 8 KB of the file following the first 16 KB.

Referring back to FIG. 1, in illustrative embodiments, file layout APIs 108 are configured to retrieve a layout of a file on a storage device 106. The layout identifies a plurality of locations on the storage device 106 where a plurality of compressed blocks of data are stored. For example, the layout comprises a plurality of tuples as described herein above, wherein respective ones of the plurality of tuples comprise an offset and a length of respective ones of the plurality of locations. The retrieving operation by a given file layout API 108 can be triggered in response to, for example, a command from a file management module 112 initiating an archiving operation for one or more files stored on a given storage array 105.

Following retrieval of the file layout from a given storage device 106, an R/W API 109 corresponding to the given storage device retrieves the plurality of compressed blocks of data from the plurality of locations identified in the layout. The R/W API 109 retrieves the plurality of compressed blocks of data by reading the respective ones of the plurality of tuples. For example, in an operational example, assuming a 50 GB file from one of the storage devices 106 is to be archived to a cloud storage platform 130, a corresponding file layout API 108 located, for example, in a storage controller 107 corresponding to the storage device 106, is executed to retrieve the layout of the 50 GB file on the storage device 106. The file layout comprises a set of (offset, length) tuples corresponding to the locations of each file data block on the storage device 106 where the compressed file data is stored. The file layout API 108 does not perform an actual read of the data. Instead, the file layout API 108 retrieves the file layout.

According to an embodiment, a data mover module that is, for example, a component of the file management module 112, iterates through the tuples representing the file layout returned by the file layout API 108. Using the R/W API 109, each tuple is read, and the storage device 106 returns the compressed blocks of data stored in respective ones of the plurality of locations of the storage device 106 identified in the layout. As noted herein above, and as shown in FIG. 2, two or more compressed blocks of data corresponding to two or more consecutive data portions of the file may be in non-contiguous locations of the storage device 106.

FIG. 3 depicts example pseudocode 300 for a file layout API 108. In the pseudocode 300, [IN] refers to an input parameter, [OUT] refers to an output parameter and [IN OUT] refers to an input and/or an output parameter. In an illustrative embodiment, the file layout API 108 is configured to retrieve a file handle (fh) corresponding to the file to be archived (e.g., the 50 GB file in the operational example). The file handle comprises, for example, a temporary file identifier (e.g., number) assigned to the file by an operating system. The file is called and accessed via the file handle. According to one or more embodiments, the file layout API 108 can assign the file handle.

The pseudocode 300 includes instructions to retrieve offsets (startOffset) and lengths (length) and to output offset and length tuples (OffsetAndLength) corresponding to the locations of each file data block on the storage device 106 where the compressed file data is stored. In the case of a large a file, given, for example, a limited amount of space in a buffer in the storage array 105 and/or in a buffer 115, the file layout data may be collected in subsets over a plurality of intervals. In a non-limiting example, the first 50 tuples of a file corresponding to a first number of kilobytes of the file (e.g., 400 KB, File (0 KB, 400 KB)) may be collected over a first time interval and buffered. Then, the next 50 tuples corresponding to the next number of kilobytes of the file (e.g., 400 KB, File (400 KB, 400 KB)) may be collected over a second time interval and buffered, etc. until the file layout of the entire file is collected. The file layout API 108 is configured to specify and/or record the number of entries (numEntries) (e.g., number of tuples) for each interval. The process repeats over a requisite number of intervals to ensure that the entire file layout is retrieved and buffered.

For each interval (if there are multiple intervals), using, for example, the R/W API 109, a storage device 106 returns the plurality of compressed blocks of data from the plurality of locations identified in the layout. Along with the compressed blocks of data, storage device 106 returns the compressed length of respective ones of the plurality of compressed blocks of data. For example, although a given file data block of a storage device 106 may be allocated to for a certain number of kilobytes (e.g., 8 KB, 16 KB, etc.), the compressed length of a compressed block may be less than the allocated number of kilobytes for the given file data block of a storage device 106. For example, instead of 8 KB or 16 KB, the compressed length can be, but is not necessarily limited to, 2 KB or 14 KB, respectively.

In illustrative embodiments, the data movement engine 111, more particularly, the buffering module 113, buffers the compressed blocks of data at each interval in, for example, a buffer 115. Additionally, a header generation module 114 generates one or more data headers specifying the compressed length of the respective ones of the plurality of compressed blocks of data. The header generation module 114 adds the one or more data headers to the compressed blocks of data. The one or more data headers and the compressed blocks of data are stored in the buffer 115 prior to being sent to a cloud storage platform 130 for storage. Other file metadata, including, for example, file identifiers (e.g., file name and/or directory name), file access times, file modification times, file attribute change times, etc. may also be included as part of the header or otherwise included with the compressed blocks of data, and sent to the cloud storage platform 130 for storage with the compressed blocks of data. According to an embodiment, once a buffer 115 is emptied following transmission of a given subset of the compressed blocks of data corresponding to a given interval, another subset of the compressed blocks of data corresponding to a subsequent interval can be buffered and sent to the cloud storage platform 130. This process can be repeated until all of the compressed blocks of data corresponding to a file are archived.

The data header comprising the compressed length of the respective ones of the plurality of compressed blocks of data is used by the cloud storage operation platform 110 and/or storage controllers 107 (e.g., R/W APIs 109) when restoring the compressed blocks of data corresponding to a file back to a storage device 106 or to another device (e.g., user device 102). When writing data to a cloud storage platform 130, the data may be stored in a different configuration than how the data was originally stored on the storage device 106. For example, the data blocks which were stored non-contiguously on the storage device 106, may be stored contiguously on the cloud storage platform 130. As a result, when sorting and parsing through the compressed blocks of data, the restoring components (e.g., R/W APIs 109) reference the compressed length of the compressed blocks of data and are configured to account for the compressed length being typically less than the allocated number of kilobytes for the given file data block of a storage device 106.

According to one or more embodiments, the storage arrays 105, buffer 115 or other data store or database used herein can be configured according to a relational database management system (RDBMS) (e.g., PostgreSQL). The storage arrays 105, buffer 115 or other data store or database in some embodiments is implemented using one or more storage systems or devices associated with the cloud storage operation platform 110. In some embodiments, one or more of the storage systems utilized to implement the databases comprise a scale-out all-flash content addressable storage array or other type of storage array. Similarly, the storage arrays 105 described herein may comprise scale-out all-flash content addressable storage arrays or other type of storage arrays.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the cloud storage operation platform 110, the data movement engine 111, the policy engine 116 and the stub file generation engine 117 in other embodiments can be implemented at least in part externally to the cloud storage operation platform 110, for example, as stand-alone servers, sets of servers or other types of systems coupled to the network 104. For example, the data movement engine 111, the policy engine 116 and the stub file generation engine 117 may be provided as cloud services accessible by the cloud storage operation platform 110. Similarly, although shown as elements of the storage arrays 105, the file layout APIs 108 and the R/W APIs 109 can be implemented at least in part externally to the storage arrays 105, for example, as stand-alone servers, sets of servers or other types of systems coupled to the network 104 (e.g., as cloud services accessible by the storage arrays 105). In some embodiments, the file layout APIs 108 and the R/W APIs 109 may be implemented in the cloud storage operation platform 110.

The data movement engine 111, the policy engine 116, the stub file generation engine 117, the file layout APIs 108 and the R/W APIs 109 in the FIG. 1 embodiment are each assumed to be implemented using at least one processing device. Each such processing device generally comprises at least one processor and an associated memory, and implements one or more functional modules for controlling certain features of the data movement engine 111, the policy engine 116, the stub file generation engine 117, the file layout APIs 108 and/or the R/W APIs 109.

At least portions of the cloud storage operation platform 110, the storage controllers 107 and the components thereof may be implemented at least in part in the form of software that is stored in memory and executed by a processor. The cloud storage operation platform 110, the storage controllers 107 and the components thereof comprise further hardware and software required for running the cloud storage operation platform 110 and the storage controllers 107, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the data movement engine 111, the policy engine 116, the stub file generation engine 117, the file layout APIs 108, the R/W APIs 109 and other components of the cloud storage operation platform 110 or the storage arrays 105 in the present embodiment are shown as part of the cloud storage operation platform 110 or the storage arrays 105, at least a portion of the policy engine 116, the stub file generation engine 117, the file layout APIs 108, the R/W APIs 109 and other components of the cloud storage operation platform 110 or the storage arrays 105 in other embodiments may be implemented on one or more other processing platforms that are accessible to the cloud storage operation platform 110 or the storage arrays 105 over one or more networks. Such components can each be implemented at least in part within another system element or at least in part utilizing one or more stand-alone components coupled to the network 104.

It is assumed that the cloud storage operation platform 110 and storage arrays 105 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the data movement engine 111, the policy engine 116, the stub file generation engine 117, the file layout APIs 108, the R/W APIs 109 and other components of the cloud storage operation platform 110 or the storage arrays 105, and the elements thereof can each be implemented in the form of one or more LXCs running on one or more VMs. Other arrangements of one or more processing devices of a processing platform can be used to implement the data movement engine 111, the policy engine 116, the stub file generation engine 117, the file layout APIs 108, the R/W APIs 109 as well as other components of the cloud storage operation platform 110 or the storage arrays 105. Other portions of the system 100 can similarly be implemented using one or more processing devices of at least one processing platform.

Distributed implementations of the system 100 are possible, in which certain components of the system reside in one datacenter in a first geographic location while other components of the system reside in one or more other data centers in one or more other geographic locations that are potentially remote from the first geographic location. Thus, it is possible in some implementations of the system 100 for different portions of the cloud storage operation platform 110 to reside in different data centers. Numerous other distributed implementations of the cloud storage operation platform 110 and/or storage arrays 105 are possible.

Accordingly, one or each of the data movement engine 111, the policy engine 116, the stub file generation engine 117, the file layout APIs 108, the R/W APIs 109 and other components of the cloud storage operation platform 110 or the storage arrays 105 can each be implemented in a distributed manner so as to comprise a plurality of distributed components implemented on respective ones of a plurality of compute nodes of the cloud storage operation platform 110 and/or storage arrays 105.

It is to be appreciated that these and other features of illustrative embodiments are presented by way of example only, and should not be construed as limiting in any way.

Accordingly, different numbers, types and arrangements of system components such as the data movement engine 111, the policy engine 116, the stub file generation engine 117, the file layout APIs 108, the R/W APIs 109 and other components of the cloud storage operation platform 110 or the storage arrays 105, and the elements thereof can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments, functionality for the cloud storage operation platform can be offered to cloud infrastructure customers or other users as part of FaaS, CaaS and/or PaaS offerings.

Figure 4:
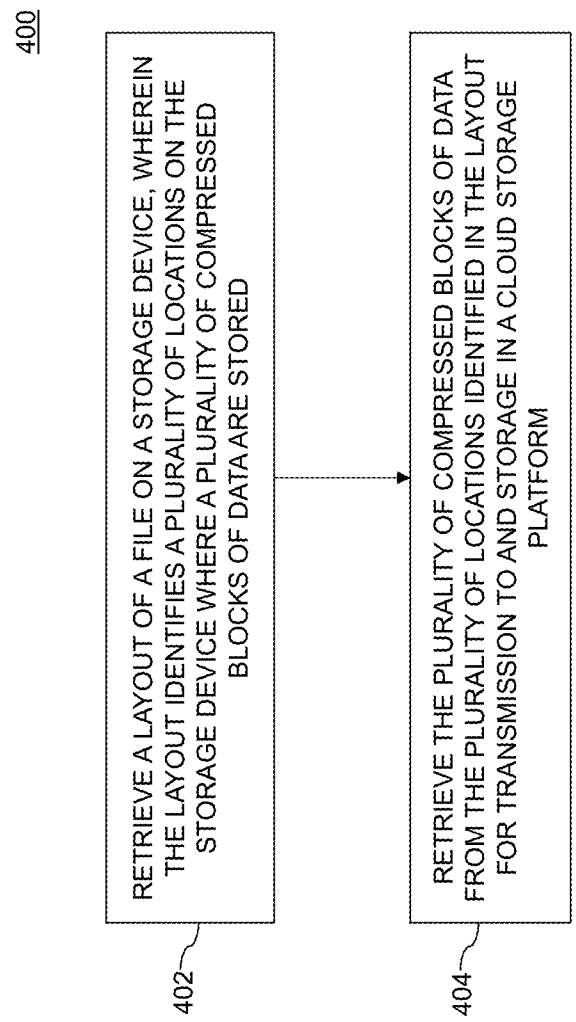
FIG. 4 depicts a process for managing retrieval of previously compressed data from a storage device for migration to a cloud storage platform according to an illustrative embodiment.

The operation of the information processing system 100 will now be described in further detail with reference to the flow diagram of FIG. 4. With reference to FIG. 4, a process 400 for managing retrieval of previously compressed data from a storage device for migration to a cloud storage platform as shown includes steps 402 and 404, and is suitable for use in the system 100 but is more generally applicable to other types of information processing systems configured for managing retrieval of previously compressed data from a storage device for migration to a cloud storage platform.

In step 402, a layout of a file on a storage device is retrieved wherein the layout identifies a plurality of locations on the storage device where a plurality of compressed blocks of data are stored. The layout of the file comprises a plurality of tuples, wherein respective ones of the plurality of tuples comprise an offset and a length of respective ones of the plurality of locations. Retrieving the plurality of compressed blocks of data from the plurality of locations identified in the layout comprises reading the respective ones of the plurality of tuples.

In step 404, the plurality of compressed blocks of data are retrieved from the plurality of locations identified in the layout. The plurality of compressed blocks of data are sent to and stored in a cloud storage platform.

According to illustrative embodiments, respective ones of the plurality of compressed blocks of data are stored in respective ones of the plurality of locations identified in the layout. In some embodiments, two or more of the plurality of compressed blocks of data corresponding to two or more consecutive data portions of the file are in non-contiguous locations of the storage device.

The process may further include returning a compressed length of respective ones of the plurality of compressed blocks of data, wherein the compressed length of the respective ones of the plurality of compressed blocks of data is sent to and stored in the cloud storage platform. One or more data headers may be generated, wherein the data headers specify the compressed length of the respective ones of the plurality of compressed blocks of data. In illustrative embodiments, the plurality of compressed blocks of data are restored from the cloud storage platform back to the storage device, wherein the restoration is based, at least in part, on the compressed length of the respective ones of the plurality of compressed blocks of data.

In one or more embodiments, respective subsets of the plurality of compressed blocks of data are buffered at different times. A plurality of data headers specifying a compressed length of one or more of the plurality of compressed blocks of data in the respective subsets may be generated. The data headers are sent to and stored in the cloud storage platform with the one or more of the plurality of compressed blocks of data in the respective subsets.

It is to be appreciated that the FIG. 4 process and other features and functionality described above can be adapted for use with other types of information systems configured to execute data retrieval and migration management services.

The particular processing operations and other system functionality described in conjunction with the flow diagram of FIG. 4 is therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 4 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a cloud storage operation platform and storage arrays as disclosed herein can provide a number of significant advantages relative to conventional arrangements. For example, unlike conventional techniques, the embodiments advantageously leverage data from storage devices that has already been compressed, and move the already compressed data to cloud storage. Conventional approaches for archiving data to cloud storage require decompressing file data to be archived, reading the data, re-compressing the data, and then sending the re-compressed data to cloud storage. The embodiments advantageously avoid decompression and re-compression operations by retrieving the compressed data from a storage device and sending that data to cloud storage, thereby saving valuable computational resources.

The illustrative embodiments provide a technical solution which utilizes one or more specialized APIs to retrieve file layouts identifying a plurality of locations on a storage device where compressed blocks of data are stored, and to retrieve the compressed blocks of data from the plurality of locations identified in the layouts. The file layouts comprise offset and length tuples which are read so that the corresponding compressed blocks of data can be retrieved and sent to a cloud storage location. As an additional advantage, the embodiments provide techniques for identifying the compressed length of the compressed blocks of data and sending the compressed length as headers with the data to be stored on a cloud storage platform.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system components such as the cloud storage operation platform 110, storage arrays 105 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system, a cloud storage operation platform and storage arrays in illustrative embodiments. These and other cloud-based systems in illustrative embodiments can include object stores.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
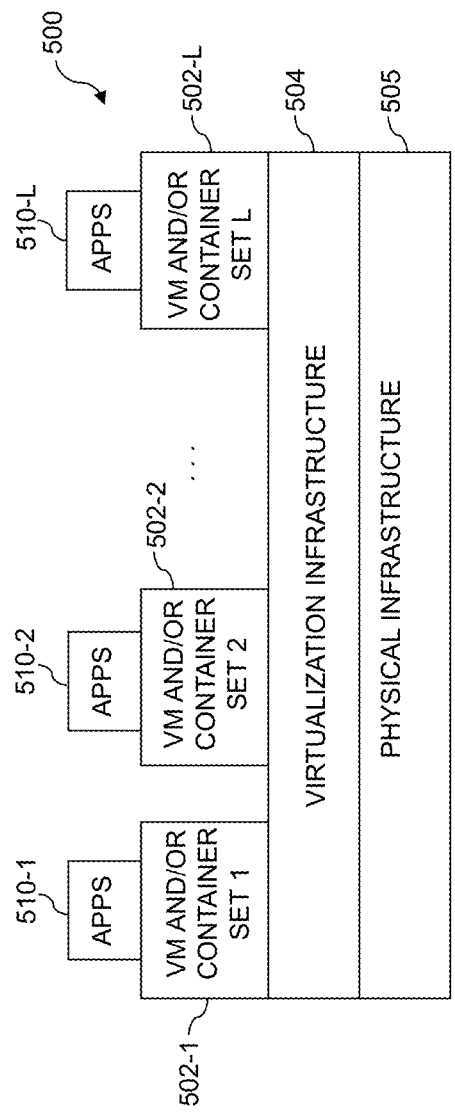
FIGS. 5 and 6 show examples of processing platforms that may be utilized to implement at least a portion of an information processing system according to illustrative embodiments.
Figure 6:
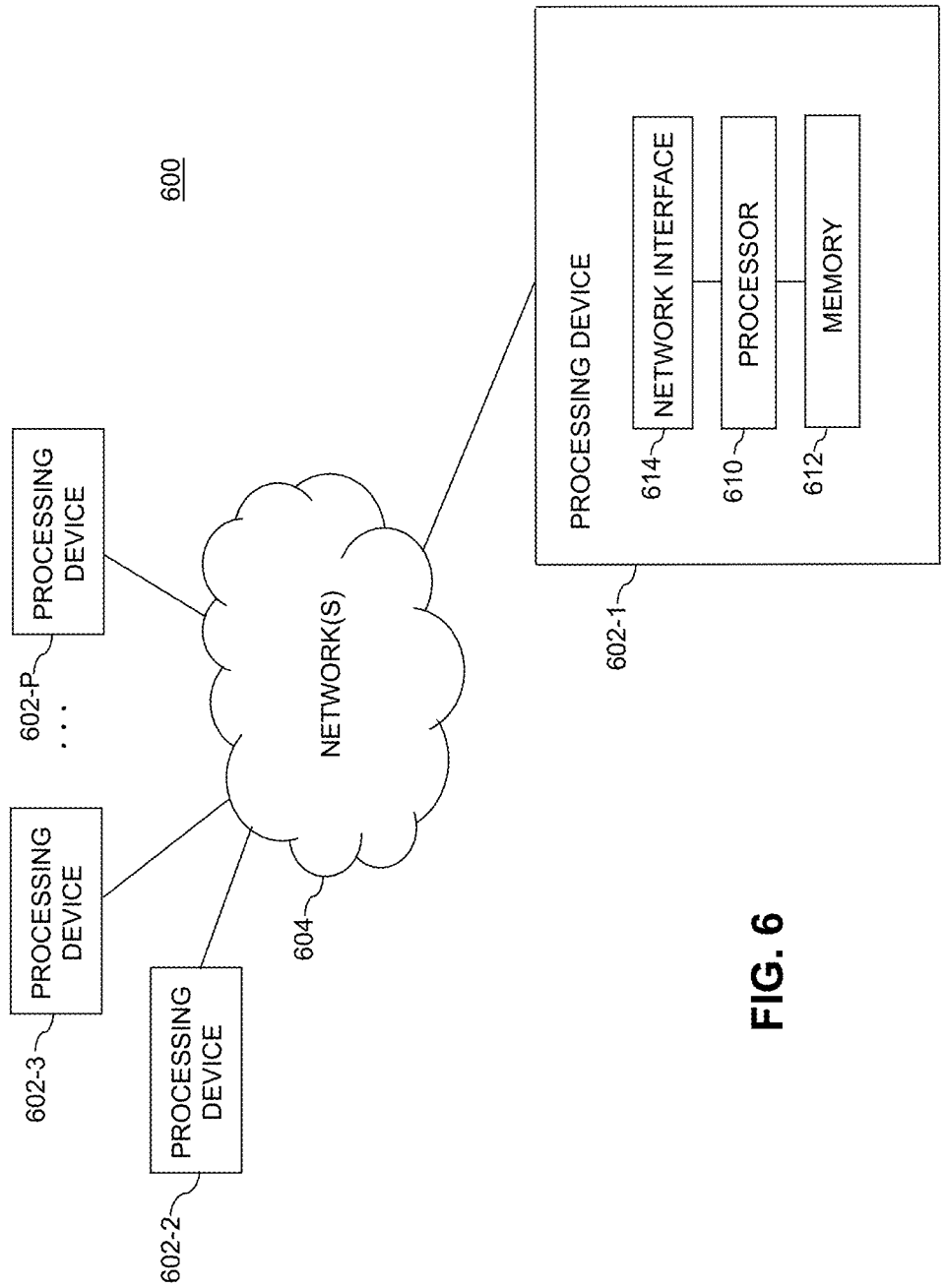

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. A hypervisor platform may be used to implement a hypervisor within the virtualization infrastructure 504, where the hypervisor platform has an associated virtual infrastructure management system. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-P, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612. The processor 610 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more components of the cloud storage operation platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and cloud storage operation platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus, comprising:
at least one processing platform comprising a plurality of processing devices;
said at least one processing platform being configured to:
retrieve a layout of a file on a storage device, wherein the layout identifies a plurality of locations on the storage device where a plurality of compressed blocks of data are stored, and wherein the layout of the file comprises a plurality of data sets, respective ones of the plurality of data sets comprising an offset and a length of respective ones of the plurality of compressed blocks of data in the plurality of locations;
retrieve the plurality of compressed blocks of data from the plurality of locations identified in the layout for transmission to and storage in a cloud storage platform;
return a compressed length of the respective ones of the plurality of compressed blocks of data, wherein the compressed length for one or more compressed blocks of the respective ones of the plurality of compressed blocks of data differs from a length specified in a tuple for the one or more compressed blocks;
generate a plurality of data headers specifying the compressed length of the respective ones of the plurality of compressed blocks of data; and
add the plurality of data headers to the respective ones of the plurality of compressed blocks of data prior to the transmission of the plurality of compressed blocks of data to the cloud storage platform.

2. The apparatus of claim 1, wherein, in retrieving the plurality of compressed blocks of data from the plurality of locations identified in the layout, said at least one processing platform is configured to read the respective ones of the plurality of data sets.

3. The apparatus of claim 1, wherein two or more of the plurality of compressed blocks of data corresponding to two or more consecutive data portions of the file are in non-contiguous locations of the storage device.

4. The apparatus of claim 1, wherein respective ones of the plurality of compressed blocks of data are stored in respective ones of the plurality of locations identified in the layout.

5. The apparatus of claim 1, wherein the compressed length of the respective ones of the plurality of compressed blocks of data is sent to and stored in the cloud storage platform.

6. The apparatus of claim 1, wherein said at least one processing platform is further configured to restore the plurality of compressed blocks of data from the cloud storage platform back to the storage device, wherein the restoration is based, at least in part, on the compressed length of the respective ones of the plurality of compressed blocks of data.

7. The apparatus of claim 1, wherein said at least one processing platform is further configured to buffer respective subsets of the plurality of compressed blocks of data at different times.

8. The apparatus of claim 1, wherein the plurality of data headers are sent to and stored in the cloud storage platform with the respective ones of the plurality of compressed blocks of data.

9. The apparatus of claim 8, wherein said at least one processing platform is further configured to restore the respective ones of the plurality of compressed blocks of data from the cloud storage platform back to the storage device, wherein the restoration is based, at least in part, on the compressed length of the respective ones of the plurality of compressed blocks of data.

10. A method, comprising:
    retrieving a layout of a file on a storage device, wherein the layout identifies a plurality of locations on the storage device where a plurality of compressed blocks of data are stored, and wherein the layout of the file comprises a plurality of data sets, respective ones of the plurality of data sets comprising an offset and a length of respective ones of the plurality of compressed blocks of data in the plurality of locations;
    retrieving the plurality of compressed blocks of data from the plurality of locations identified in the layout for transmission to and storage in a cloud storage platform;
    returning a compressed length of the respective ones of the plurality of compressed blocks of data, wherein the compressed length for one or more compressed blocks of the respective ones of the plurality of compressed blocks of data differs from a length specified in a tuple for the one or more compressed blocks;
    generating a plurality of data headers specifying the compressed length of the respective ones of the plurality of compressed blocks of data; and
    adding the plurality of data headers to the respective ones of the plurality of compressed blocks of data prior to the transmission of the plurality of compressed blocks of data to the cloud storage platform;
    wherein the method is performed by at least one processing platform comprising at least one processing device comprising a processor coupled to a memory.

11. The method of claim 10, wherein retrieving the plurality of compressed blocks of data from the plurality of locations identified in the layout comprises reading the respective ones of the plurality of data sets.

12. The method of claim 10, wherein two or more of the plurality of compressed blocks of data corresponding to two or more consecutive data portions of the file are in non-contiguous locations of the storage device.

13. The method of claim 10, further comprising restoring the plurality of compressed blocks of data from the cloud storage platform back to the storage device, wherein the restoration is based, at least in part, on the compressed length of the respective ones of the plurality of compressed blocks of data.

14. The method of claim 10, further comprising buffering respective subsets of the plurality of compressed blocks of data at different times.

15. A computer program product comprising a non-transitory processor-readable storage medium having stored therein program code of one or more software programs, wherein the program code when executed by at least one processing platform causes said at least one processing platform to:
    retrieve a layout of a file on a storage device, wherein the layout identifies a plurality of locations on the storage device where a plurality of compressed blocks of data are stored, and wherein the layout of the file comprises a plurality of data sets, respective ones of the plurality of data sets comprising an offset and a length of respective ones of the plurality of compressed blocks of data in the plurality of locations;
    retrieve the plurality of compressed blocks of data from the plurality of locations identified in the layout for transmission to and storage in a cloud storage platform;
    return a compressed length of the respective ones of the plurality of compressed blocks of data, wherein the compressed length for one or more compressed blocks of the respective ones of the plurality of compressed blocks of data differs from a length specified in a tuple for the one or more compressed blocks;
    generate a plurality of data headers specifying the compressed length of the respective ones of the plurality of compressed blocks of data; and
    add the plurality of data headers to the respective ones of the plurality of compressed blocks of data prior to the transmission of the plurality of compressed blocks of data to the cloud storage platform.

16. The computer program product according to claim 15, wherein retrieving the plurality of compressed blocks of data from the plurality of locations identified in the layout comprises reading the respective ones of the plurality of data sets.

17. The computer program product according to claim 15, wherein two or more of the plurality of compressed blocks of data corresponding to two or more consecutive data portions of the file are in non-contiguous locations of the storage device.

18. The computer program product according to claim 15, wherein the compressed length of the respective ones of the plurality of compressed blocks of data is sent to and stored in the cloud storage platform.

19. The computer program product according to claim 15, wherein the program code further causes said at least one processing platform to restore the plurality of compressed blocks of data from the cloud storage platform back to the storage device, wherein the restoration is based, at least in part, on the compressed length of the respective ones of the plurality of compressed blocks of data.

20. The computer program product according to claim 15, wherein the program code further causes said at least one processing platform to buffer respective subsets of the plurality of compressed blocks of data at different times.

* * * * *